United States Patent
Neto

[15] 3,682,439
[45] Aug. 8, 1972

[54] VALVE WITH ROTARY ELEMENTS

[72] Inventor: Eduardo de Lima Castro Neto, Estrada do Timbo 63, Rio de Janeiro, Brazil

[22] Filed: May 19, 1971

[21] Appl. No.: 144,909

Related U.S. Application Data

[63] Continuation-in-part of Ser. No. 783,452, Nov. 18, 1968.

[30] Foreign Application Priority Data

Dec. 14, 1967 Brazil......................195.555

[52] U.S. Cl...............................................251/315
[51] Int. Cl..............................................F16k 5/06
[58] Field of Search.............251/315, 316, 175, 367; 137/454.5, 454.6

[56] References Cited

UNITED STATES PATENTS

| | | |
|---|---|---|
| 2,813,695 | 11/1957 | Stognet......................251/175 |
| 3,041,036 | 6/1962 | McFarland, Jr............251/315 |
| 3,157,382 | 11/1964 | Perry.....................251/315 X |
| 3,171,431 | 3/1965 | Hansen et al............137/454.6 |
| 3,184,217 | 5/1965 | Petrin........................251/367 |
| 3,223,111 | 12/1965 | Anderson..............251/315 X |
| 3,239,190 | 3/1966 | Mayo........................251/175 |
| 3,479,006 | 11/1969 | Brown...................251/316 X |

*Primary Examiner*—Samuel Scott
*Attorney*—Wenderoth, Lind & Ponack

[57] ABSTRACT

A fluid flow regulating valve having a central hollow split ball valve element rotatably controlled within an inner split ball valve housing, both being fabricated of elastomeric resilient materials such as nylon or Teflon and the like. The inner split housing is of frusto-conical form to lend itself to compressive self-sealing adjustment within a complementally shaped recess within the main outer valve housing or body. The ball element and housing are diametrically apertured to provide for selective fluid passage therethrough, with the inner housing apertures provided with peripheral resilient annular sealing seats to complementally sealingly engage with the spherical surface of the ball valve element responsive to manual adjustment as well as to fluid pressure. The construction is such that fluid pressure of the flow media being valved is able to partially deform the upstream portion of the ball element and its annular inner housing seat to admit fluid pressure into the interior of the hollow ball and to greatly assist in pressure sealing, not only the downstream side of the ball and valve seat, but also subsequently the upstream side upon equalization of the fluid pressure within the ball element.

10 Claims, 7 Drawing Figures

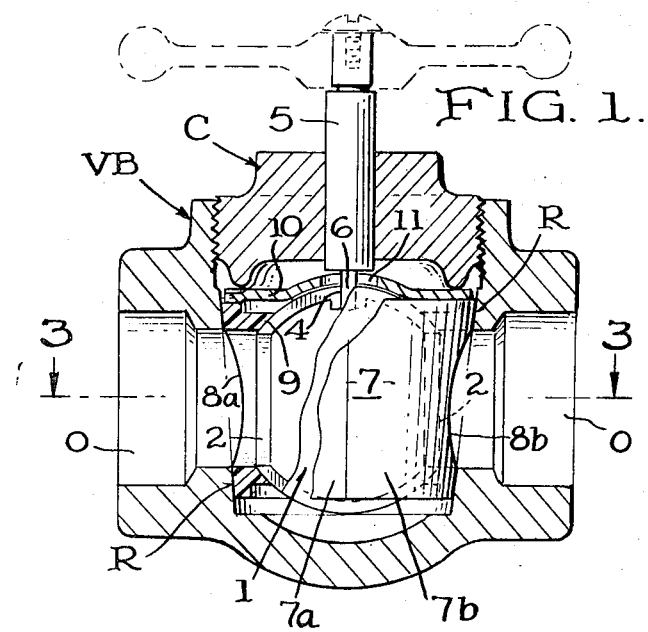
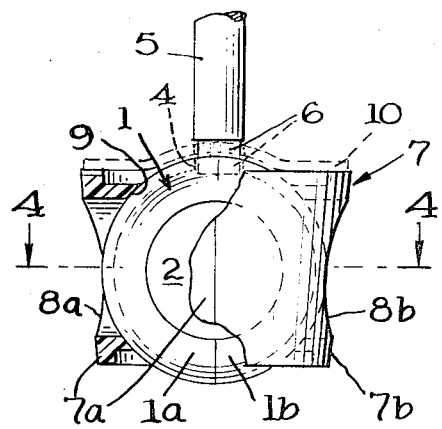
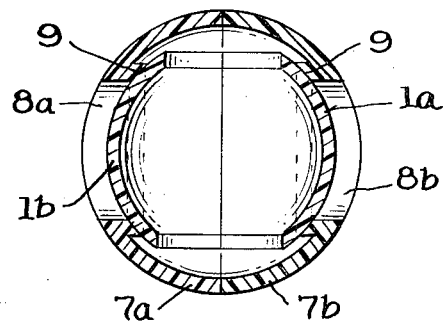
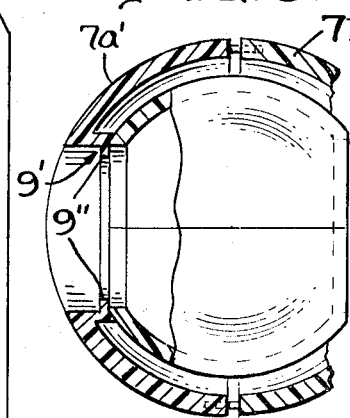

VALVE WITH ROTARY ELEMENTS

This application is a continuation-in-part of my original application, Ser. No. 783,452, filed Nov. 18, 1968.

This application relates to fluid valves having a hollow spherical rotary valve element, and more particularly to such valve embodying split symmetrical hemispherical ball valve components of resilient elastomeric material rotatable as a ball valve unit within an outwardly frusto-conical shaped split inner valve housing of similar material, and of which the ball and housing are provided respectively with diametrically opposed fluid passage openings adapted for alignment with the corresponding openings in an outer main valve body or housing adapted to be installed in a fluid flow line. The outer valve body has a complementally shaped recess to house the frusto-conically shaped inner housing which is adjustably held therein by a screw-threaded cover plate operatively engaging the inner housing at its larger diameter side.

The principal object of the invention is to provide an improved valve construction of the foregoing character wherein the pressure of the fluid media flowing the line in which valves of this type are installed is used to greatly aid in more effectively sealing the valve when in a closed condition by the fluid gaining entrance internally of the split ball valve element and building up fluid pressure internally to auxiliary aid the sealing of the valve.

This principal objective, along with other objectives and advantages, will become more apparent from the following detailed description taken in conjunction with the illustrative drawings depicting a preferred embodiment of the invention, wherein:

FIG. 1 is a view partially in cross-section and partially in elevation of my improved rotary valve in the open condition;

FIG. 2 is a similar view, but only of the split ball and inner ball housing, but shown in the closed condition;

FIG. 3 is a horizontal cross-sectional view of the two part ball valve and its two part inner housing, as seen on line 3—3 of FIG. 1;

FIG. 4 is a view similar to FIG. 3, but taken on line 4—4 of FIG. 2;

FIG. 5 is a perspective view of some of the valve components shown in an exploded manner;

FIG. 6 is a fragmentary cross-sectional detail of one half of a modified seat shown in its unstressed condition for part of the ball valve element; and FIG. 7 is a similar view thereof shown in the stressed condition.

Referring in more detail to the drawings, a hollow sphere-like ball valve element 1 is comprised of two symmetrical hemispherical sections 1a and 1b, each having opposed semi-circular complemental openings 2a (FIG. 5) in the diametrical edge which cooperate to form diametrically opposed fluid flow apertures 2 therein when assembled into the spherical ball form. Each section is also provided with a notch 3a in the diametrical edge, midway between openings 2a, so that a rectangular slot 4 is formed in the assembled condition to provide an entry opening for the flattened inner end 6 of a shaft 5, to thereby facilitate rotation of the ball as disposed within the hollow, outwardly frusto-conical inner housing 7.

The inner housing 7 is also formed of two symmetrical split sections 7a and 7b, which are also provided with openings 8a and 8b, respectively, in diametrically opposed fashion to correspond to and align with the opposed main inlet and outlet openings O in the main or outer valve body VB. The opposed openings 8a and 8b of the inner housing each have formed annularly therearound an inner complementally spherically contoured seat portion 9 for self-seating and self-sealing cooperation with the spherical surface of the composite ball valve element, and the frusto-conically shaped inner housing 7 seats within a complementally tapered frusto-conical shaped recess R provided in the main body of the tap valve, thereby facilitating and and assuring wear take-up adjustment responsive to selective rotatable tightening of a preferably single cover or plug-like member C threaded within the main valve body and operatively engaging and overlaying the upper portions of the inner split housing to effect mutual cooperative sealing between the split ball element and the split inner housing as well as between the split inner housing and the outer main valve body without need of any auxiliary sealing members.

The frusto-conical inner housing 7 is open at its upper end to permit entry of the valve-actuating shaft 5, which also cooperates with a centrally apertured overlaying cover 10 which overlays the assembled ball and inner housing components, and which cover is preferably utilized to provide rotation limiting stops or abutments 11 to limit the ball valve in its 90° rotational movement between the open and closed positions. When such a cover 10 is used in the assembly, a detent 12 or the like is provided to engage with a complementally formed recess 12a (FIG. 5) in the upper edge of one of the inner housing half sections, thereby providing a proper predetermined orientation of the valve stem and ball relative to the valve openings and to preclude its inadvertant displacement after all of the valve components are assembled.

The cover 10 is held in assembly with the other components by pressure of the lower portion of the cover C, which effects a self-seating and self-sealing interrelationship of the split ball valve and split inner housing components, as wedged together in the frusto-conical recess R of the valve body VB. The recess R is of a tapering depth in excess of the depth to which the inner housing normally is initially disposed, i.e., the lower portion of the inner housing 7 does not initially reach the bottom of the recess, thereby leaving room for subsequent wear-take-up adjustment by the subsequent tightening of the plug-cover C to exert greater compressive force on the components. In this regard, the two halves 7a and 7b of the inner housing are made so as not be fit in tightly abutting relation when initially assembled, but are slightly spaced apart so that upon any infrequent necessity of effecting wear take-up adjustment, the two parts will be compressibly forced downward in the recess and toward one another with the attendant sealing adjustment of the seats 9 relative to the ball 1.

Referring to FIGS. 6 and 7, a modified form of annular seating flange 9' is shown projecting inwardly in a diametrical fashion from the half portion 7b'. Flange 9' includes an annular sealing lip 9'' which in FIG. 6 is shown in an unstressed condition, i.e., wherein the ball valve is not closed and not seated tightly thereagainst. FIG. 7 shows the lip 9" in its stressed or valve closed condition wherein, due to the elastomeric character and unique construction, the pressure of the fluid flowing through the line and valve manages to find its way inside of the ball valve element and acts to dilate the split ball components to materially assist in effecting a more efficient seal against passage of fluid therethrough.

Because in these preferred forms the inner housing is made of a generally elastomeric resilient material such as nylon, the contact surfaces between it and the outer housing act as effective seals without the necessity of any special sealing arrangement. The advantage of this is immediately apparent and this particular feature is very simple with the advantage that removal of the inner housing is easy and its final adjustment can be made by the simple tightening of the plug cover.

In a very satisfactory working embodiment, the included angle of the conical aperture and inner housing is preferably of 6°. That is to say, 3° away from the vertical. Although this angle is not in any way limiting, it has been found in practice that it meets all practical requirements.

When the cover C is screw tightened into the aperture formed in the outer valve body, the inner housing becomes compressed and the sealing lips or seats 9 are compressed against the surfaces of the sphere 1a and 1b. The sphere is constructed from a relatively rigid and preferably plastic material such as DuPont's DELRIN, although many other similar materials such as PTFE are equally suitable. When the more flexible inner housing 7a and 7b is compressed, the sealing lips 9 are deformed against the surface of the sphere to present excellent sealing conditions. Thus, even if the sphere is initially loose inside the inner housing, it is positioned exactly and in sealing relation with the same on tightening of the threaded plug. Should the sphere become worn with long use, the flexibility of the inner housing makes it possible to further tighten the plug member which forces the two parts of the inner housing into a more deformed condition to maintain proper sealing with the sphere.

The main advantage of the two-piece sphere will now be considered. When one side of the closed valve is connected to a high pressure fluid inlet, the air or fluid under pressure forces its way into the interior of the inner chamber by slight deflection of the sealing lip 9 or 9" on that side of the valve and by slight compression of the sealing lip on the low pressure side of the valve which gives rise to slight dislocation of the plastic sphere in the low pressure direction. At the same time, of course, the seal on the outlet side of the valve will be maintained in view of the pressure force on the sphere compressing the same in the direction of the outlet. The fluid which has penetrated into the interior of the inner housing may then pass into the interior of the ball both through apertures 8 and slot 3, whereupon there is pressure balance between the interior of the ball and the pressure side of the valve whereby the sealing lip on the pressure side of the valve ceases to be deformed due to a differential pressure, while on the low pressure side of the valve, the other half of the sphere is maintained in firm sealing relationship with its respective sealing lip 9 or 9' due to the full differential pressure being applied across that half of the valve shell. Opposite the outlet opening it is apparent that the pressure in the interior of the inner housing will assist in forcing lip 9 against the sphere on the outlet side. It is interesting to note the efficiency achieved by this improved construction, as evidenced by what happens if the high pressure is removed from the inlet of the closed valve. In such a case, the high pressure already existing in the interior of the sphere and the inner housing will force the two halves of the sphere away from each other so that both are in perfect sealing relation with their sealing lips. In this illustrative case, a high pressure air was applied to the input side of the closed valve until a complete seal was made and then the pressure input was then disconnected. The valve was then left for a week, after which it was opened The release of the high pressure air within the sphere gave rise to a noise similar to that of a small caliber rifle, which gives a true impression of the sealing efficiency.

The use of pressure of the fluid itself within the sphere assisting in the absolute sealing on the outlet side is enirely new when compared with known prior art valves in which mechanical means have been employed for forcing the sphere surfaces against its seats. In particular, reference is made to U.S. Pat. No. 3,157,380 in which the ball is partly split and a cam arrangement 25 attached to the operating angle expands the ball when in the closed position so as to ensure sealing. Similarly, U.S. Pat. No. 3,064,937 has a split ball in which the two halves are mechanically maintained in contact by means of a cam arrangement so as to provide a transverse sliding movement between the two halves of the spheres to provide sealing at both sealing surfaces. Accordingly, it is apparent that the split sphere arrangement of my valve does not rely on any of these mechanical devices which are subject to wear, but instead upon the pressure of the fluid itself. Furthermore, it has been found that in the case of low pressure fluids an excellent seal is obtained due to the resilience of the sealing lips which are deformed when the cover plug is tightly screwed into the outer housing to compress the inner housing against its own surface and against the surface of the sphere.

Another advantage obtained by the sealing lips being of an elastomeric or flexible material instead of the rigid sealing surfaces normally provided is that when the valve is in the closed position the sealing lips on the upstream side maintain a considerable pressure against the sphere which at least partially balances the greater pressure at the sealing surface of the downstream side. This results in a better balanced arrangement when it comes to opening the valve as compared with conventional valves which are difficult to open due to a large pressure inbalance on the sphere.

It is also apparent that in high pressure applications the valve will still operate efficiently, even if the two sphere halves are somewhat loose within the two-piece inner housing, this being due to the fact that the fluid or air enters the interior of the sphere and forces the downstream half of the sphere away from its other half so as to provide important sealing on the downstream side. Moreover, if the pressure is then removed from the upstream side of the valve, the pressure inside the sphere will force its two halves oppositely away from each other to provide both upstream and downstream sealing in an efficient manner. This has also been tested with very favorable results.

The fact that the sealing lips are elastically deformable, that the inner housing can be tightened in its cavity to form the lips against the sphere, and the fact that the valve will operate efficiently even if the two sphere halves are loose within the inner housing (which can only happen after continued long wear of the sphere has resulted in successive tightening of the threaded plug to the extent that the inner housing has reached the bottom of the cavity in the valve body) means that the valve of this invention has an extremely long life. This is a marked improvement as compared with the known prior art valves in which the sealing between the valve's sphere and the inner housing cannot be tightened and the sphere has to be in perfect adjustment for correct operation of the valve. In such prior art conventional valves, any wear of the sphere or the sealing surface of the inner housing results in faulty operation and leaking of the valve. It is further apparent that the present improved valve construction will have considerably longer and more efficient working life.

Accordingly, it is apparent that a markedly improved split ball valve construction has been evolved which achieves the objectives and advantages as set forth throughout this specification. Other variations and modifications may be made (such as the complemental coacting pin and recess means provided in the opposed adjacently disposed diametrical edges of the two part inner housing) without departing from the spirit and scope of the invention as defined in the accompanying claims.

What is claimed is:

1. In a rotary ball valve construction embodying an outer valve body having a threaded plug cover to compressively retain and hold the valve components in assembly, and having openings to a hollow interior, both to receive the ball valve therein and to provide a passage through said valve body for a flowable fluid, the improvement comprising, in combination; a composite spherically shaped hollow ball valve member having symmetrically split generally hemispherical portions formed to provide diametrical flow passage openings therethrough when rotatively disposed for alignment with corresponding openings in the outer valve body, said split ball portions being mechanically unattached to one another; a hollow composite two part symmetrically split inner ball housing having diametrically opposed flow openings in alignment with the flow passage openings in said outer valve body, said inner housing having a generally frusto-conical outer shape when assembled, and with means to mount said ball valve member in floating relation therein for rotative self-seating and self-sealing movement when the ball member is rotated approximately 90° to present unapertured diametrical portions thereof in closing relation to the through openings of said inner housing and outer valve body, said inner housing with ball valve member disposed within a recessed opening in the outer valve body, which opening is of complemental frusto-conical or tapered shape to facilitate the self-seating and self-sealing of both the said inner housing within the outer valve body recessed tapered opening and of the ball valve member within said inner housing without need for the use of external sealing means, and said inner housing being fabricated of an elastomeric like material having at least semi-flexible or resilient characteristics to enable it to undergo a predetermined elastic-like deformation upon being tightened into the valve body, said deformation being able to occur both between the exterior conical like surface of the inner housing and the complemental recess of the outer valve body, and between said inner housing means mounting the split ball valve and the ball valve itself.

2. A rotary ball valve construction as defined in claim 1 wherein the means of said inner housing to mount said ball valve member include integral inwardly directed annular sealing flanges adjacent the flow openings of the respective split half portions of the inner housing and having a sealing surface of arcuate cross-section to conform to the arcuate surface of the spherical ball valve member.

3. A rotary ball valve construction as defined in claim 1 including means for rotating said ball member from the exterior of said outer valve body, which latter means include a valve shaft having an inner toothed end for insertion into a slot formed by symmetrical adjoining recesses in the upper part of the ball member.

4. A valve construction as defined in claim 1 wherein the hemispherical portions of the ball valve member respectively have complementally mating diametrical marginal edges in which edges said diametrical flow passage openings are cooperatively and compositely mutually formed.

5. A valve construction as defined in claim 1 wherein said diametrically opposed flow openings of said split inner housing are formed uninterruptedly in intermediate portions of said split housing and said split portions have complementary opposed terminal edge portions adapted to be disposed in adjacent relationship in assembled condition within the outer valve body.

6. A valve construction as defined in claim 5 wherein said complementary opposed terminal edge portions of said inner split housing are at least initially in a noncontiguous adjacent relationship.

7. A valve construction as defined in claim 5 wherein said complementary opposed terminal edge portions of said inner split housing portions have complementally co-acting pin and recess means to help orient said split housing portions, said pin and recess means constructed and disposed so as to provide for said split portions to be moved progressively closer to a maximum of fully abutting contact of the split housing portions responsive to tightening adjustment pressure of said plug cover which is disposed to operatively adjust said inner housing from above.

8. A valve construction as defined in claim 1 further including an inner housing upper cover plate of generally circular formation adapted to overlay upon the split inner housing and to be engaged from above by the plug cover in the assembled condition, said inner cover plate being apertured to receive an inner end of shaft means therethrough for cooperative interlocking engagement with aperture means formed in an upper portion of said split ball valve member; the other outer end of which shaft means extends exteriorly of said assembled valve and includes means exteriorly thereof to rotate said ball valve member between the open and closed positions.

9. A valve construction as defined in claim 8 wherein said inner cover plate includes abutment means thereon to limit a predetermined amount of rotation of said ball valve and connected actuating shaft means within a range between an open and closed condition of the valve, and further including means to maintain the cover and abutment means in proper orientation relative to the other valve component members.

10. In a rotary ball valve construction embodying an outer valve body having a threaded plug cover to compressively retain and hold the valve components in assembly, and having openings to a hollow interior, both to receive the ball valve therein and to provide passage through said valve body for a flowable fluid, the improvement comprising in combination, a composite spherically shaped hollow ball valve member having symmetrically split generally hemispherical portions formed to provide diametrical flow passage openings therethrough when rotatively disposed for alignment with corresponding openings in the outer valve body, said split ball portions being mechanically unattached to one another; a hollow composite two part symmetrically split inner ball housing having diametrically opposed flow openings in alignment with the flow passage openings in said outer valve body, said inner housing having a generally frusto-conical outer shape when assembled, and with means to mount said ball valve member in floating relation therein for rotative self-seating and self-sealing movement when the ball member is rotated approximately 90° to present unapertured diametrical portions thereof in closing relation to the through openings of said inner housing and outer valve body, said means of said inner housing to mount said ball valve member include integral inwardly directed annular sealing flanges adjacent the flow openings of the respective split half portions of the inner housing and having a sealing surface of arcuate cross-section to conform to the arcuate surface of the spherical ball valve member; said inner housing with ball valve member disposed within a recessed opening in the outer valve body, which opening is of complemental frusto-conical or tapered shape to facilitate the self-seating and self-sealing both of the said inner housing within the outer valve body recessed tapered opening and of the ball valve member within said inner housing without need for use of external sealing means; said inner housing being fabricated of an elastomeric like material having at least semiflexible or resilient characteristics to enable it to undergo a predetermined elastic-like deformation upon being tightened into the valve body, said deformation being able to occur both between the exterior conical-like surface of the inner housing and the complemental recess of the outer valve body and between said inner housing means mounting the split ball valve and the ball valve itself; and further including means for rotating said ball member from the exterior of said outer valve body, which latter means include a valve shaft having an inner toothed end for insertion into a slot formed by symmetrical adjoining recesses in the upper part of the ball member.

* * * * *